US010856358B2

(12) United States Patent
Zhang et al.

(10) Patent No.: US 10,856,358 B2
(45) Date of Patent: Dec. 1, 2020

(54) HIERARCHICAL CDRX CONFIGURATION FOR DYNAMIC BANDWIDTH PART MANAGEMENT AND POWER SAVING

(71) Applicant: Apple Inc., Cupertino, CA (US)

(72) Inventors: Wei Zhang, Santa Clara, CA (US); Yuchul Kim, Santa Clara, CA (US); Junsung Lim, San Jose, CA (US); Haitong Sun, Irvine, CA (US); Wei Zeng, San Diego, CA (US); Sami M. Almalfouh, San Jose, CA (US); Yang Li, Plano, TX (US); Zhu Ji, San Jose, CA (US); Dawei Zhang, Saratoga, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/295,517

(22) Filed: Mar. 7, 2019

(65) Prior Publication Data

US 2019/0281652 A1 Sep. 12, 2019

Related U.S. Application Data

(60) Provisional application No. 62/641,519, filed on Mar. 12, 2018.

(51) Int. Cl.
*H04W 76/28* (2018.01)
*H04W 72/04* (2009.01)
(Continued)

(52) U.S. Cl.
CPC ........... *H04W 76/28* (2018.02); *H04W 24/10* (2013.01); *H04W 52/0216* (2013.01);
(Continued)

(58) Field of Classification Search
CPC .................................................... H04W 76/28
See application file for complete search history.

(56) References Cited

U.S. PATENT DOCUMENTS

2016/0143086 A1  5/2016  Kahtava
2018/0199343 A1  7/2018  Deogun
(Continued)

OTHER PUBLICATIONS

Qualcomm Incorporated; "Remaining Issues on BWP"; 3GPP Draft; R1-1802844; 3rd Generation Partnership Project (3GPP); Mobile Competence Centre; 650, Route Des Lucioles; F-06921 Sophia-Antipolis Cedex; France; vol. RAN WG1, No. Athens, Greece; Feb. 26, 2018-Mar. 2, 2018; Feb. 17, 2018; 24 pages.

(Continued)

*Primary Examiner* — Edan Orgad
*Assistant Examiner* — Won Tae C Kim
(74) *Attorney, Agent, or Firm* — Kowert, Hood, Munyon, Rankin & Goetzel, P.C.

(57) ABSTRACT

Apparatuses, systems, and methods for a base station to perform a method construct dynamic hierarchical sub-configurations of bandwidth parts (BWPs) for use in a connected mode discontinuous reception (CDRX) communication session with a user equipment (UE) device. The base station may configure a first BWP at a baseband frequency associated with the CDRX communication session as a default BWP, a second BWP with a wider bandwidth than the first BWP as a transmission BWP, and one or more third BWPs as resting BWPs. The transmission BWP and the one or more resting BWPs may be configured to periodically override the default BWP as the active BWP for a predetermined number of CDRX cycles. The transmission BWP may be utilized, when activated to perform data transmission by UE device, and the one or more resting BWPs may be utilized, when activated, for performing channel measurements.

19 Claims, 8 Drawing Sheets

(51) Int. Cl.
*H04W 24/10* (2009.01)
*H04W 76/25* (2018.01)
*H04W 52/02* (2009.01)

(52) U.S. Cl.
CPC ..... *H04W 72/042* (2013.01); *H04W 72/0453* (2013.01); *H04W 76/25* (2018.02)

(56) References Cited

U.S. PATENT DOCUMENTS

| | | | |
|---|---|---|---|
| 2018/0270756 A1 | 9/2018 | Bhattad et al. | |
| 2018/0332655 A1 | 9/2018 | Bhattad | |
| 2019/0103954 A1* | 4/2019 | Lee | H04L 5/0098 |
| 2019/0132109 A1* | 5/2019 | Zhou | H04L 5/0098 |
| 2019/0215900 A1* | 7/2019 | Pan | H04W 76/38 |

OTHER PUBLICATIONS

Potevio; "BWP switch on C-DRX"; 3GPP Draft; R2-1712969; 3rd Generation Partnership Project (3GPP), Mobile Competence Centre; 650, Route Des Lucioles; F-06921 Sophia-Antipolis Cedex; France; vol. RAN WG2, No. Reno, USA; Nov. 27, 2017-Dec. 1, 2017; Nov. 17, 2017; three pages.

Qualcomm Incorporated; "Open Issues on BWP"; 3GPP Draft; R1-1720693; 3rd Generation Partnership Project (3GPP), Mobile Competence Centre; 650, Route Des Lucioles; F-06921 Sophia-Antipolis Cedex; France; vol. RAN WG1, No. Reno, NV, USA; Nov. 27, 2017-Dec. 1, 2017; Nov. 18, 2017; 15 pages.

Samsung; "On Bandwidth Part Operation"; 3GPP Draft; R1-1720349; 3rd Generation Partnership Project (3GPP), Mobile Competence Centre; 650, Route Des Lucioles; F-06921 Sophia-Antipolis Cedex; France; vol. RAN WG1, No. Reno, USA; Nov. 27, 2017-Dec. 1, 2017; Nov. 17, 2017; five pages.

International Search Report and Written Opinion; International Patent Application No. PCT/US2019/021542 dated May 5, 2019; 10 pages.

* cited by examiner

HIERARCHICAL CDRX CONFIGURATION FOR DYNAMIC BANDWIDTH PART MANAGEMENT AND POWER SAVING

PRIORITY CLAIM

This application claims priority to U.S. Provisional Patent Application No. 62/641,519, titled "Hierarchical CDRX Configuration for Dynamic Bandwidth Part Management and Power Saving" and filed on Mar. 12, 2018, which is hereby incorporated by reference in its entirety, as though fully and completely set forth herein.

FIELD

The present application relates to wireless devices, and more particularly to apparatus, systems, and methods for a wireless device to dynamically manage a bandwidth part hierarchy.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from media access control (MAC) and higher layers. LTE also defines a number of physical layer channels for the uplink (UL).

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow the available bandwidth used in communication between a base station and a UE to be divided into multiple bandwidth parts (BWP). Consequently, efforts are being made in ongoing developments of 5G-NR to take advantage of the flexibility in BWP allocation in order to further leverage power savings opportunities. According, improvements in the field are desirable.

SUMMARY

Embodiments relate to apparatuses, systems, and methods to construct dynamic hierarchical connected mode discontinuous reception (CDRX) sub-configurations for each of a plurality of bandwidth parts (BWPs).

In some embodiments, a 5G NR base station such as a gNB may be configured to implement methods for constructing hierarchical sub-configurations of BWPs in a CDRX communication session with a user equipment device (UE).

The base station may configure a first BWP at a baseband frequency associated with the CDRX communication session as a default BWP and may further configure a second BWP with a wider bandwidth than the first BWP as a transmission BWP. The first BWP may be at baseband and may be a relatively narrowband BWP (i.e., it may have a more narrow bandwidth than the second BWP). The UE may be configured to use the default BWP as the active BWP unless it is overridden by the transmission BWP. The transmission BWP may be configured to periodically override the default BWP as the active BWP for a predetermined number of CDRX cycles. The UE may utilize the transmission BWP, when activated, for performing data transmission.

The base station may further configure one or more third BWPs as resting BWPs, which may periodically override the default BWP as the active BWP. The resting BWPs may be utilized, when activated, for performing channel measurements.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
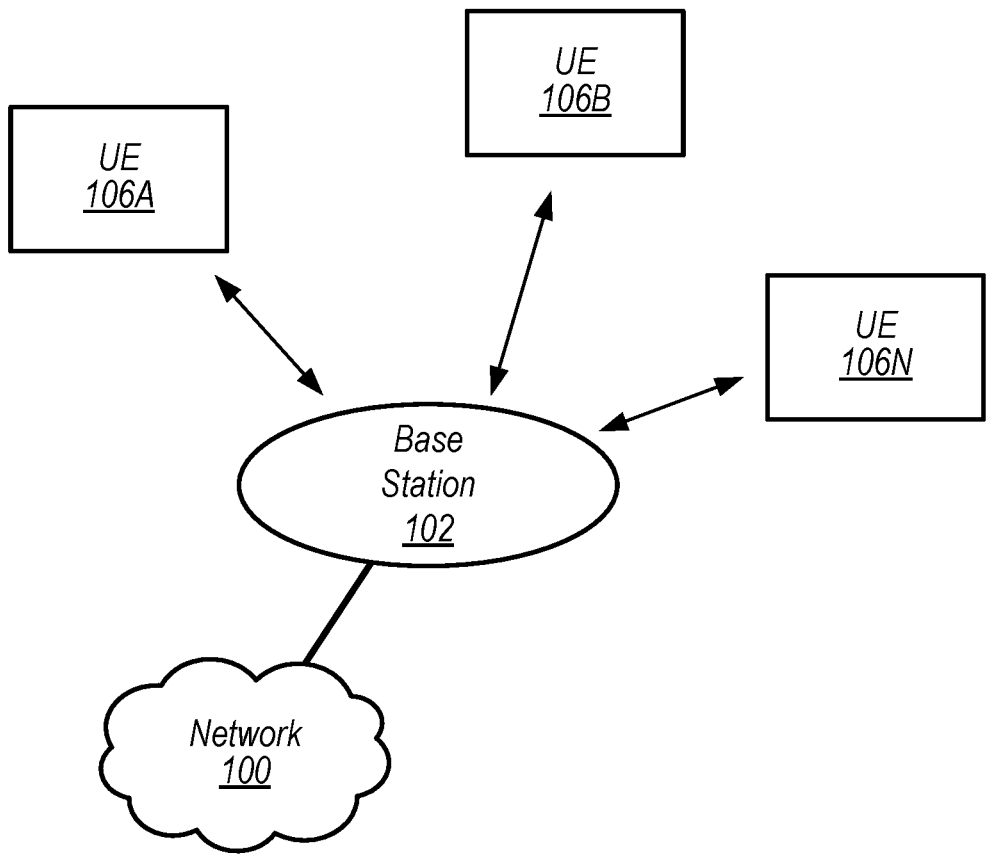
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
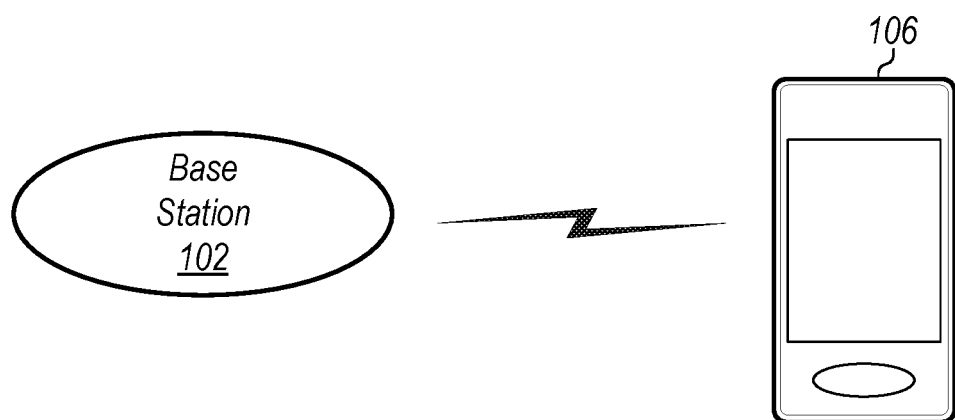
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1× EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1× EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1× EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
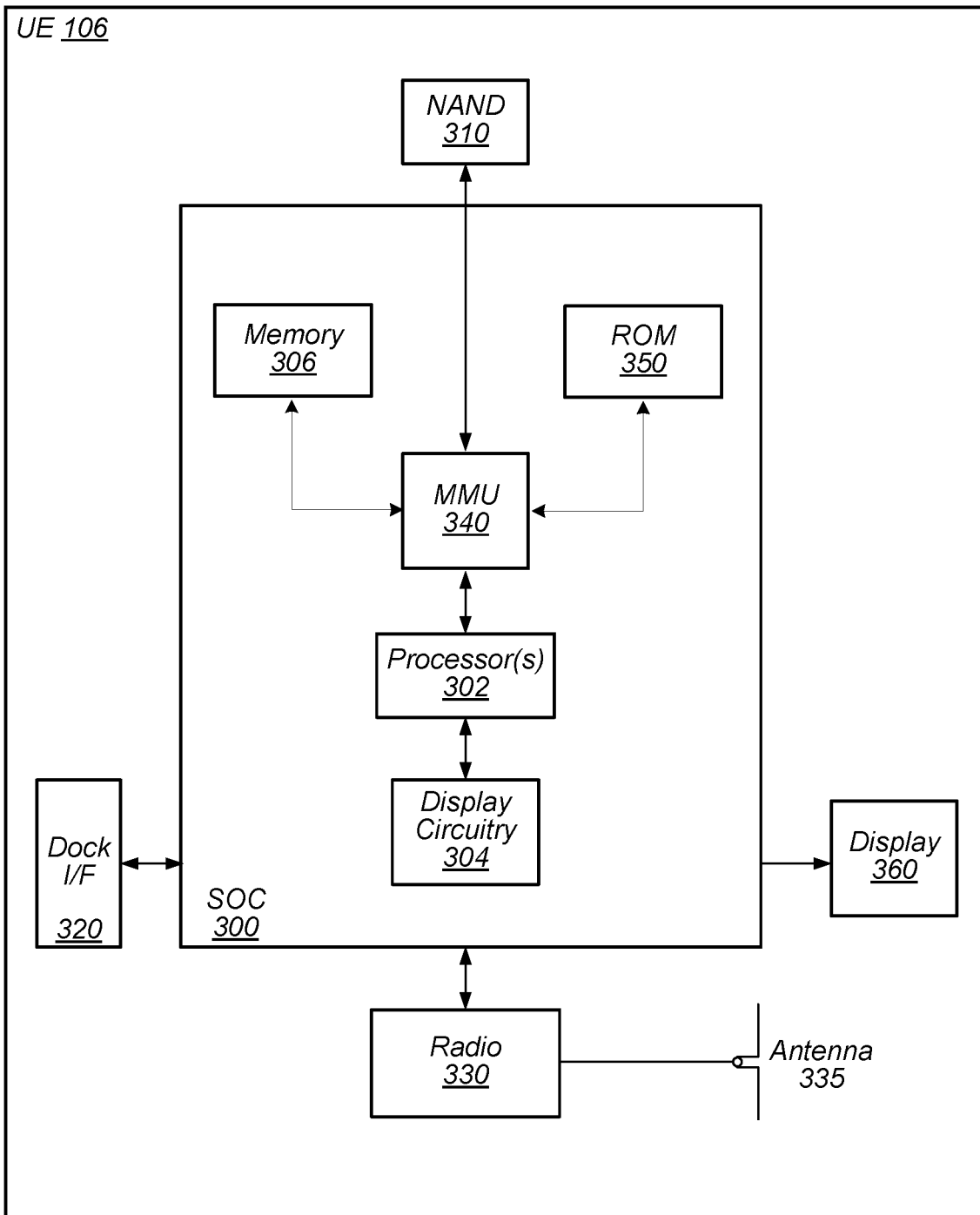
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform a method including performing one or more of periodic beam quality measurements and/or event based beam quality measurements, determining, based at least in part on one or more of the periodic beam quality measurements and/or the event based beam quality measurements, a recommended beam quality measurement configuration, and transmitting, to a base station serving the UE, the recommended beam quality measurement configuration. In addition, the UE may perform receiving, from the base station, instructions regarding the beam quality measurement configuration. The instructions may include instructions to activate, deactivate, and/or modify at least one beam quality measurement configuration. In addition, the instructions may be based, at least in part, on the recommend beam quality measurement configuration.

As described herein, the communication device 106 may include hardware and software components for implementing the above features for recommending a beam quality measurement configuration. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
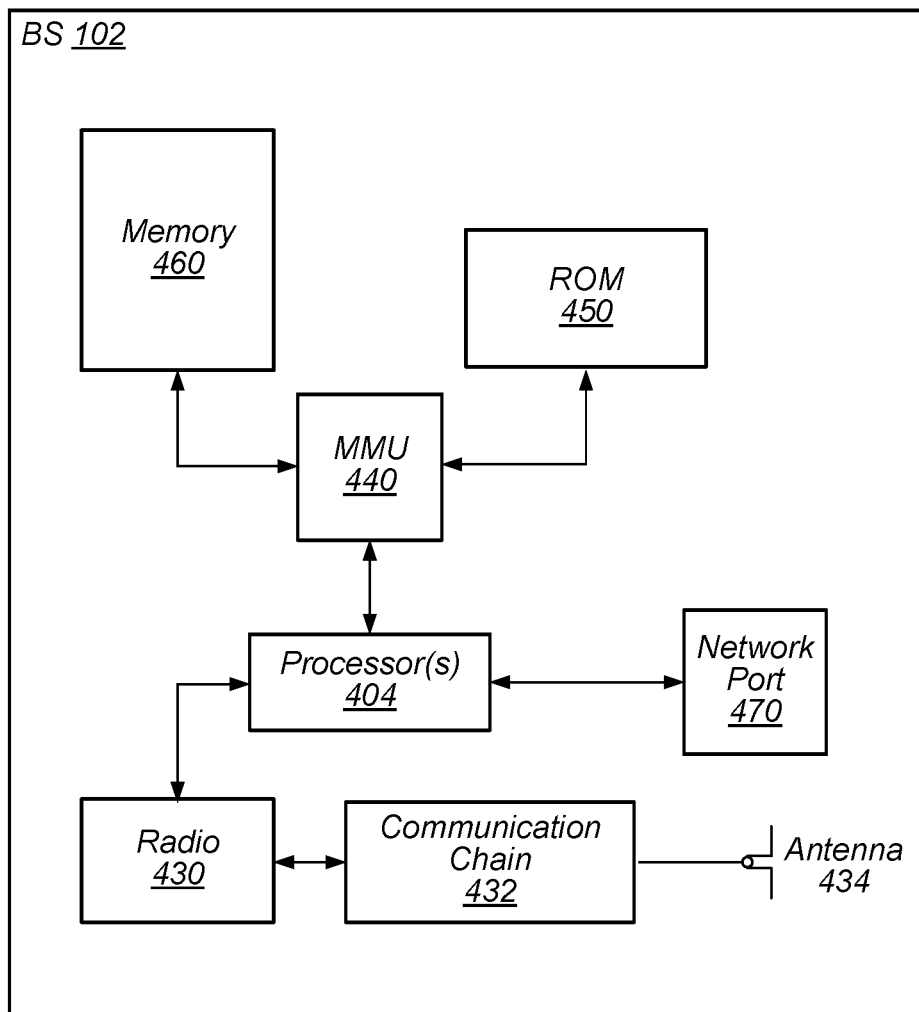
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Bandwidth Parts in 5G NR

It is anticipated that 5G NR may partition the available bandwidth for a communication session between a UE and a gNB into multiple bandwidth parts (BWPs). At any given time, only one of the BWPs may be actively used at a time, and the BWP being used may be referred to as the active BWP. The active BWP may switch over time, and the switching between active BWPs may be directed by downlink control information (DCI) messages, and/or it may be based on a timer. For example, when a UE has data to be transmitted, DCI received from the gNB may direct the UE to use a particular BWP as the active BWP for the data transmission. In some embodiments, the UE may switch back to a default active BWP once a timer expires.

When conducting PDCCH grant monitoring, it may be desirable for a UE to operate at the minimum bandwidth BWP that is able to accomplish PDCCH grant monitoring, to save power. It is anticipated that up to 4 BWPs may be configured for 5G NR, and the particular choice of an active BWP may vary according to different specific implementations.

A UE may supply feedback for the active BWP in a preference and beamforming report, but the UE may not supply feedback for inactive BWPs. For example, in current NR standards, the UE may not be required/expected to measure/report quality of BWPs that are configured but not yet activated. However, a UE may be expected to perform CSI measurements within its active downlink (DL).

In some embodiments, a gNB may switch a UE to an active BWP to conduct radio measurements, such as a channel state information reference signal (CSI-RS) on downlink (DL) and/or a sounding reference signal (SRS) on uplink (UL). In general, scheduling these measurements may require additional messaging and power drain. Autonomous measurement by a UE on other configured but non-active BWPs may be difficult and/or not feasible given that the UE may not be informed of CSI-RS scheduling on the particular BWP to be measured, such that it may be advantageous for the network to coordinate the measurements.

Even though channel quality indicators (CQIs), beamforming, and SRS may be reported based on the current active BWP, the measurements may lead to inaccuracies if the active BWP is switched to other active BWPs for data transmission, and the measurements are not updated with sufficient frequency (i.e., if measurements have not been performed since the active BWP was switched). Current implementations may use an outer loop method whereby the gNB may not know the CQI of a particular active BWP, but may probe different transmission parameters (e.g. different frequencies or other parameters such as different modulation coding schemes (MCS) and/or different transport block sizes (TBS)) to determine which parameters give the UE a higher throughput. However, these outer loop methods may take a significant amount of time to converge, thereby increasing network latency.

Embodiments herein present a systematic design to coordinate active BWP switching for data transmission and channel measurements to reduce overhead on the network and at the UE and gNB.

Hierarchical CDRX Configuration

In some embodiments, a hierarchical connected mode discontinuous reception (CDRX) configuration may be employed with two or more levels of CDRX sub-configurations. Each sub-configuration may share the same CDRX cycle but may be scheduled on different BWPs. In some embodiments, a higher level CDRX sub-configuration may overwrite a lower level sub-configuration. At any particular CDRX ON period, a UE may only wake up on one active BWP for data transmission and/or channel measurements.

A gNB may activate and/or deactivate sub-configurations. Additionally or alternatively, the gNB may change the sub-configuration of configured BWPs using media access control-control elements (MAC-CE).

In some embodiments, up to four sub-configurations may be configured for up to four BWPs. Each BWP may be activated and deactivated using MAC-CE. Furthermore, a BWP that is configured for a particular sub-configuration may be changed through MAC-CE. For example, MAC-CE may be used by the gNB to activate and/or deactivate sub-configurations, and/or MAC-CE may be used by the gNB to change the BWP associated with one or more sub-configurations, without necessarily changing the active status of the one or more sub-configurations. For example, as explained in further detail below, if a first BWP that is currently assigned to a high-level sub-configuration is determined (e.g., based on channel measurements) to be experiencing better channel conditions than a second BWP that is the current mid-level BWP, the first BWP may replace the second BWP as the mid-level BWP, and the second BWP may be switched to become a high-level BWP.

In some embodiments, to facilitate BWP management, there may be three levels of CDRX sub-configurations. First, a low-level sub-configuration may be configured as the default BWP which may be the most frequently used (i.e., active) sub-configuration. In exemplary embodiments, the default BWP may be configured in the baseband frequency and at a smaller bandwidth than the mid-level and high-level configurations. The default BWP may be active for each CDRX cycle, unless a higher level CDRX sub-configuration is active for that CDRX cycle, in which case the higher level CDRX sub-configuration may overwrite the lower level default sub-configuration.

Second, a mid-level sub-configuration may be configured as a transmission BWP, which may be the preferred configuration for data transmission, which may be used less frequently than the low-level sub-configuration. The mid-level sub-configuration may be configured for a wider bandwidth BWP than the low-level (default) sub-configuration, which may enable it to function more effectively for data throughput.

Third, a high-level sub-configuration may be configurated as a resting BWP, which may be used less frequently than the low- and mid-level sub-configurations. For example, there may be two or more BWPs which are configured as high-level sub-configurations, which may be infrequently used for channel measurements. The mid-level and high-level sub-configurations may be reallocated to different BWPs depending on the results of the channel measurements. For example, if a high-level BWP is determined to have higher quality channel conditions than the current mid-level BWP, the gNB may reconfigure the high-level BWP to have a mid-level sub-configuration.

Figure 5:
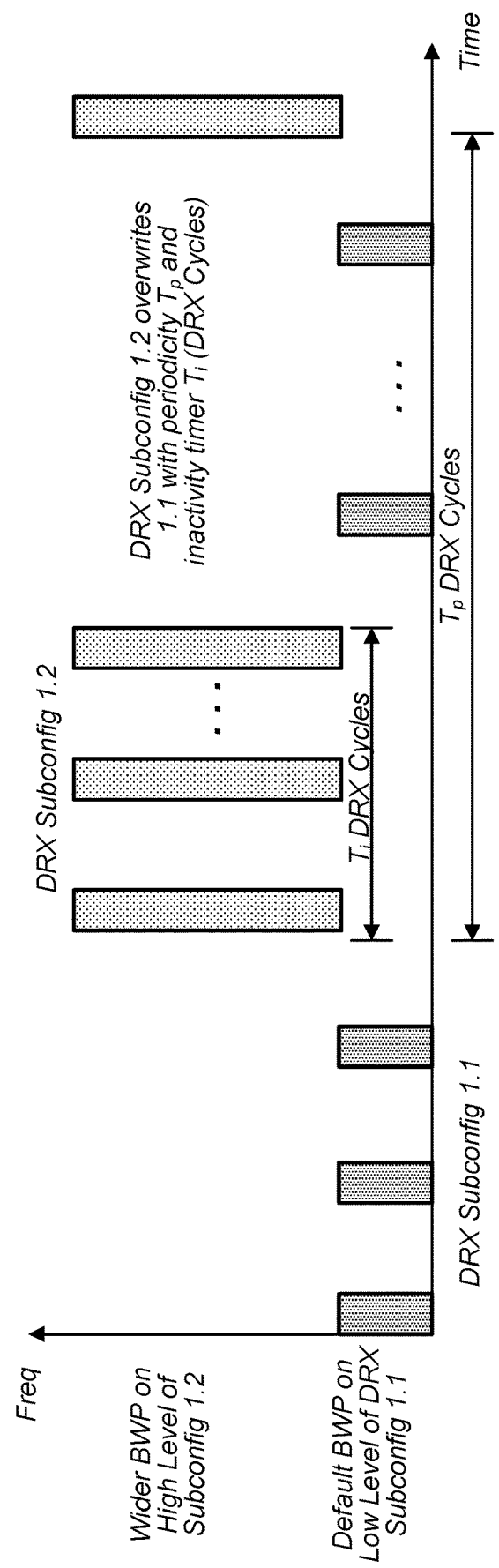
FIG. 5 is a graph of hierarchical connected mode discontinuous reception (CDRX) sub-configurations using a first and second bandwidth part (BWP), according to some embodiments.

In some embodiments each level except for the default (low-level) BWP may be configured with its own periodicity $T_p$ and inactivity timer $T_i$, which may be measured in terms of fractions of the CDRX cycle length. The periodicity $T_p$ may specify the number of CDRX cycles after which the mid-level and/or high-level BWP may repeat its activation schedule. The inactivity timer $T_i$ may specify the number of CDRX cycles for which the mid-level and high-level BWP will remain active each time it is activated. For example, as illustrated in FIG. 5, a default BWP is used at the baseband for the first three CDRX cycles. Then, the mid-level BWP, at a higher frequency and with a wider bandwidth than the default BWP, is activated for $T_i$ CDRX cycles, overriding the default BWP (the default BWP is not active for these $T_i$ CDRX cycles). Subsequently (after the $T_i$ CDRX cycles), the default BWP may resume activity until $T_p$ CDRX cycles have transpired since the mid-level BWP was activated, at which point the mid-level BWP may reactivate for another $T_i$ CDRX cycles.

Figure 6:
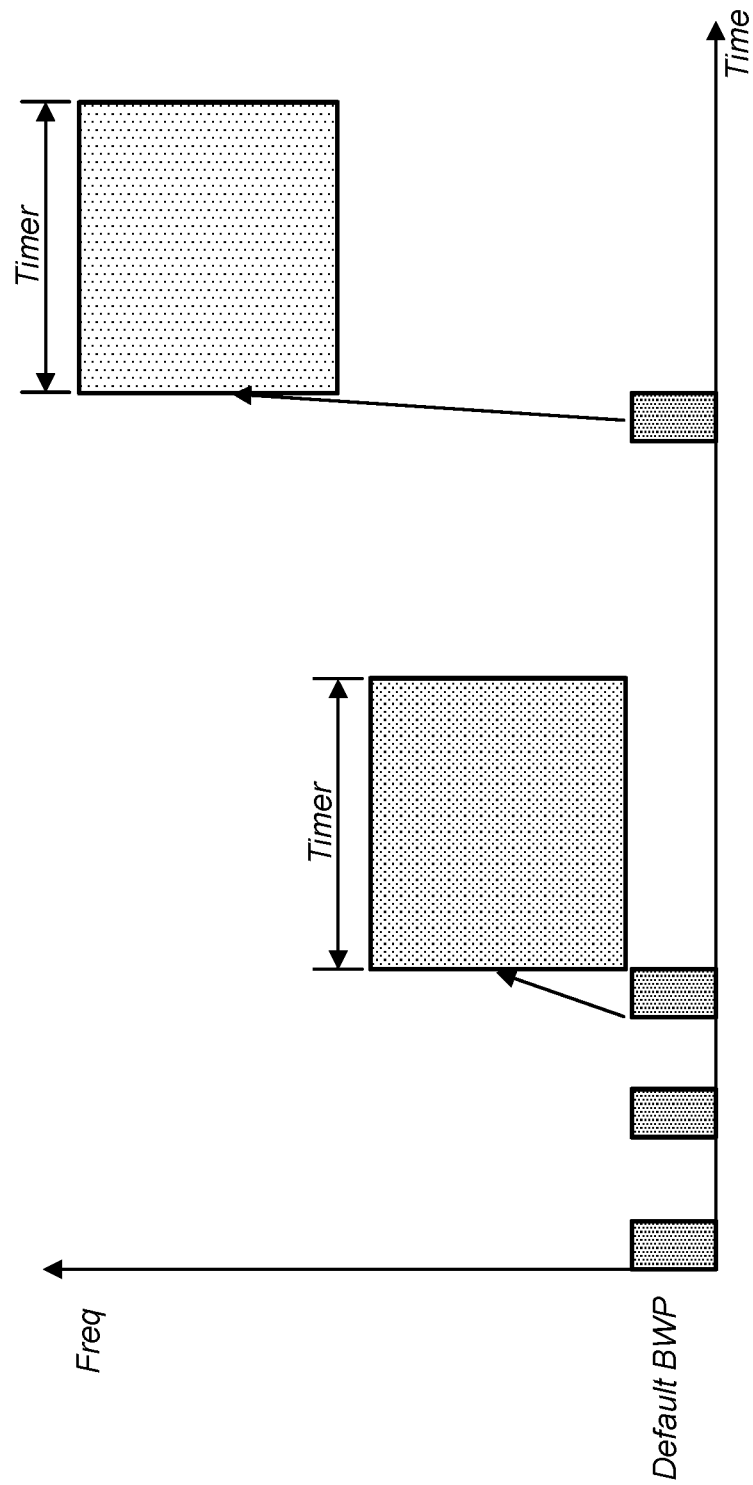
FIG. 6 is a graph of a method for allocating different BWPs as active BWPs, according to some prior art.
Figure 7:
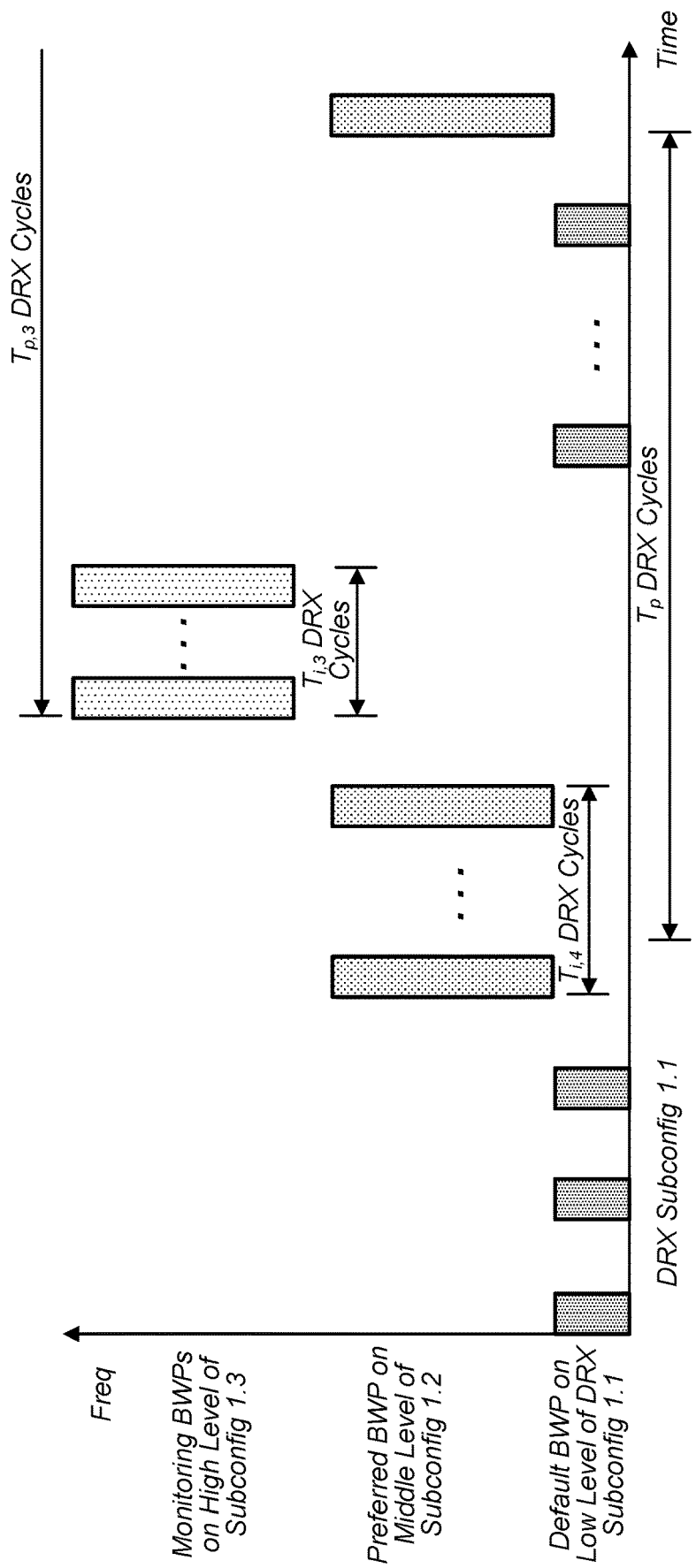
FIG. 7 is a is a graph of a hierarchical CDRX sub-configurations using a first, second, and third bandwidth part (BWP), according to some embodiments.

FIGS. 6-7 Comparison of Hierarchical CDRX Sub-Configurations with Legacy Implementations FIGS. 6 and 7 illustrate a comparison between an existing implementation for configuration of BWPs and some embodiments described herein. For example, FIG. 6 illustrates how, in some existing implementations, BWPs may be activated in an ad hoc manner, resulting in extra communication latency as the UE must be informed of the change in BWP activation status, and a BWP switch timer may have to expire before communication can commence on a newly activated BWP. In contrast, FIG. 7 illustrates how systematic scheduling of 3 hierarchical sub-configurations may reduce network latency and power expenditure by scheduling specific BWPs to activate at particular CDRX cycles, each for a particular number of consecutive CDRX cycles, before reverting to activation of the default BWP.

Embodiments herein present a systematic methodology to coordinate active BWPs for data transmission and channel measurements. Flexible CDRX sub-configurations may be employed which periodically switch between active BWPs. Radio resource management (RRM) and CSI measurements, as well as data transmissions, may be performed on the currently active BWP. Advantageously, this may extend the UE's off period and may also enable periodic CSI-RS measurements on BWPs, as interruptions to the current CDRX OFF period may be avoided (e.g., interruptions may occur more frequently using an ad-hoc measurement assignment). According to embodiments described herein, a measurement may be initiated simultaneously (or substantially simultaneously) with the initiation of the CDRX ON duration. Power may be saved by the UE by avoiding extra wakeup periods for conducting measurements. Additionally, by systematically scheduling the active BWPs, the UE may no longer need to wait for a BWP switch timer when changing the active BWP.

By allowing the gNB to decide a UE's BWP selection, convergence time for data transmission may be reduced. Additionally, the lower scheduling granularity of a wider BWP per UE may reduce scheduling difficulties for scheduling wakeup signals (WUS) and/or go-to-sleep signals (GSS). For example, it is anticipated that NR 5G may employ WUS and/or GSS, and scheduling for WUS and/or GSS may involve the gNB taking into consideration each UE's CDRX on/off status and DL buffer status to predict whether signals may be sent.

Figure 8:
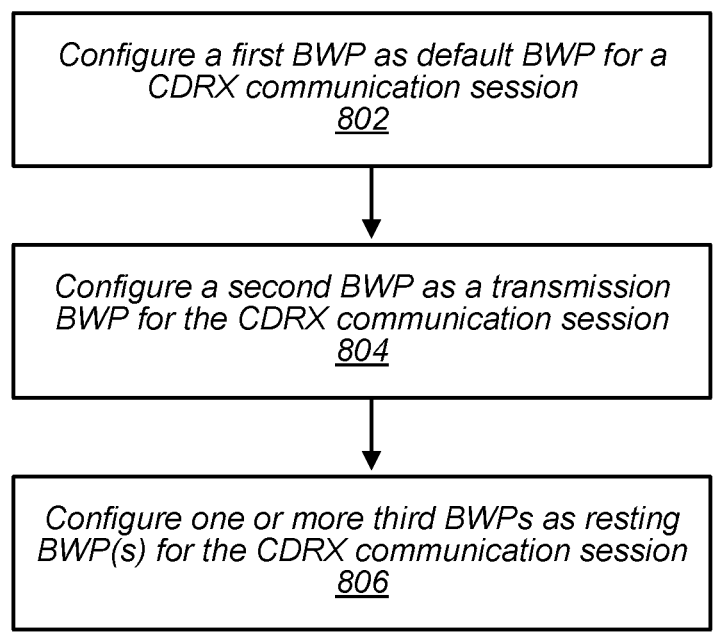
FIG. 8 is a flowchart diagram illustrating a method for configurating a default BWP, a transmission BWP, and/or a resting BWP, according to some embodiments.

FIG. 8—Configuration of Default, Transmission, and Resting BWPs

FIG. 8 is a flowchart diagram illustrating an exemplary method for configuring one or more of a default, transmission, and resting BWP for a CDRX communication session. The method shown in FIG. 8 may be used in conjunction with any of the computer systems or devices shown in the above Figures, among other devices. As one possibility, the method of FIG. 8 may be implemented by a base station (BS) 102 (e.g., an eNB or a gNB) illustrated in and described with respect to FIGS. 1-2 and 4. The BS 102 may comprise a radio and a processing element operably coupled to the radio. In various embodiments, some of the elements of the method shown may be performed concurrently, in a different order than shown, or may be omitted. Additional elements may also be performed as desired. As shown, the method may operate as follows.

At 802, a first bandwidth part (BWP) may be configured as a default BWP for a connected mode discontinuous reception (CDRX) communication session with a user equipment device (UE). In some embodiments, being configured as the default BWP causes the first BWP to be an active BWP unless it is overridden.

At 804, a second BWP may be configured as a transmission BWP for the CDRX communication session with the UE. In some embodiments, being configured as a transmission BWP causes the second BWP to periodically override the first BWP as the active BWP.

The second BWP may be configured as the transmission BWP based at least in part on channel conditions experienced by the second BWP. For example, the second BWP may be configured as the transmission BWP based at least in part on the second BWP experiencing desirable channel conditions (e.g., better channel conditions than a third and/or fourth BWP that is also considered as a candidate to become the transmission BWP). The first BWP may be located at a baseband frequency, and the second BWP may have a wider bandwidth than the first BWP. The transmission BWP may periodically override the default BWP as the active BWP to enable the UE to more effectively transmit uplink data, by utilizing the wider bandwidth of the transmission BWP. However, the default BWP may serve as the active BWP for a larger portion of each CDRX cycle, thereby preserving energy because the default BWP is at baseband and has a more narrow band than the transmission BWP.

The transmission BWP may periodically override the first BWP as the active BWP for a predetermined number of CDRX cycles. In some embodiments, the BS may notify the UE through a downlink control information (DCI) message to reactivate the first BWP as the active BWP before expiration of the predetermined number of CDRX cycles.

In some embodiments, the BS may utilize media access control-control elements (MAC-CE) to activate or deactivate one or both of the default BWP and the transmission BWP.

At 806, one or more third BWPs may be configured as resting BWPs for the CDRX communication session with the UE. In these embodiments, being configured as the resting BWP may cause the resting BWP to be periodically activated (i.e., the resting BWP may periodically override the default BWP as the active BWP) for performing channel measurements. Note that configuration of one or more resting BWPs is optional, and step 806 may be omitted in some embodiments.

In some embodiments, the base station may determine based at least in part on the channel measurements that the third BWP is experiencing better channel conditions than the second BWP. Based at least in part on this determination, the BS may reallocate the third BWP as the transmission BWP and the second BWP as the resting BWP. Channel conditions may change and/or drift over time, and periodic channel measurements may be utilized to dynamically alter which BWPs are configured as the transmission and resting BWPs, such that the BWP experiencing the best channel conditions of the available BWPs may be configured as the transmission BWP, to improve data transmission performance by the UE.

In some embodiments, the channel measurements are performed by the UE on the resting BWP, and the channel measurements are supplied by the UE to the BS. The BS may reallocate the third BWP as the transmission BWP and the second BWP as the resting BWP by utilizing media access control-control elements (MAC-CE).

In some embodiments, each of the transmission BWP and the resting BWP may be configured with their own respective periodicity and inactivity timer durations. For example, the transmission BWP may periodically override the default BWP as the active BWP with a first periodicity $T_{p,t}$, and the resting BWP may periodically override the default BWP as the active BWP with a second periodicity $T_{p,r}$. Each of the periodicities $T_{p,t}$ and $T_{p,a}$ may specify a number of CDRX cycles after which the respective BWP may repeat its activation schedule. Furthermore, the transmission BWP and the resting BWP may be respectively configured with inactivity timers $T_{i,t}$ and $T_{i,r}$ that specify a duration of their respective active BWP override procedures. For example, the inactivity timers may specify a number of CDRX cycles for which the respective BWP will override the default BWP as the active BWP. In some embodiments, each of the two periodicities and the two inactivity timer durations may be selected such that the transmission BWP and the resting BWP do not conflict in their respective attempts to override the default BWP as the resting BWP. For example, the values $T_{p,t}$, $T_{p,r}$, $T_{i,t}$, $T_{i,r}$ may be selected such that the transmission BWP and the resting BWP do not override the default BWP as the active BWP at the same time (e.g., as illustrated in FIG. 7).

Figure 9:
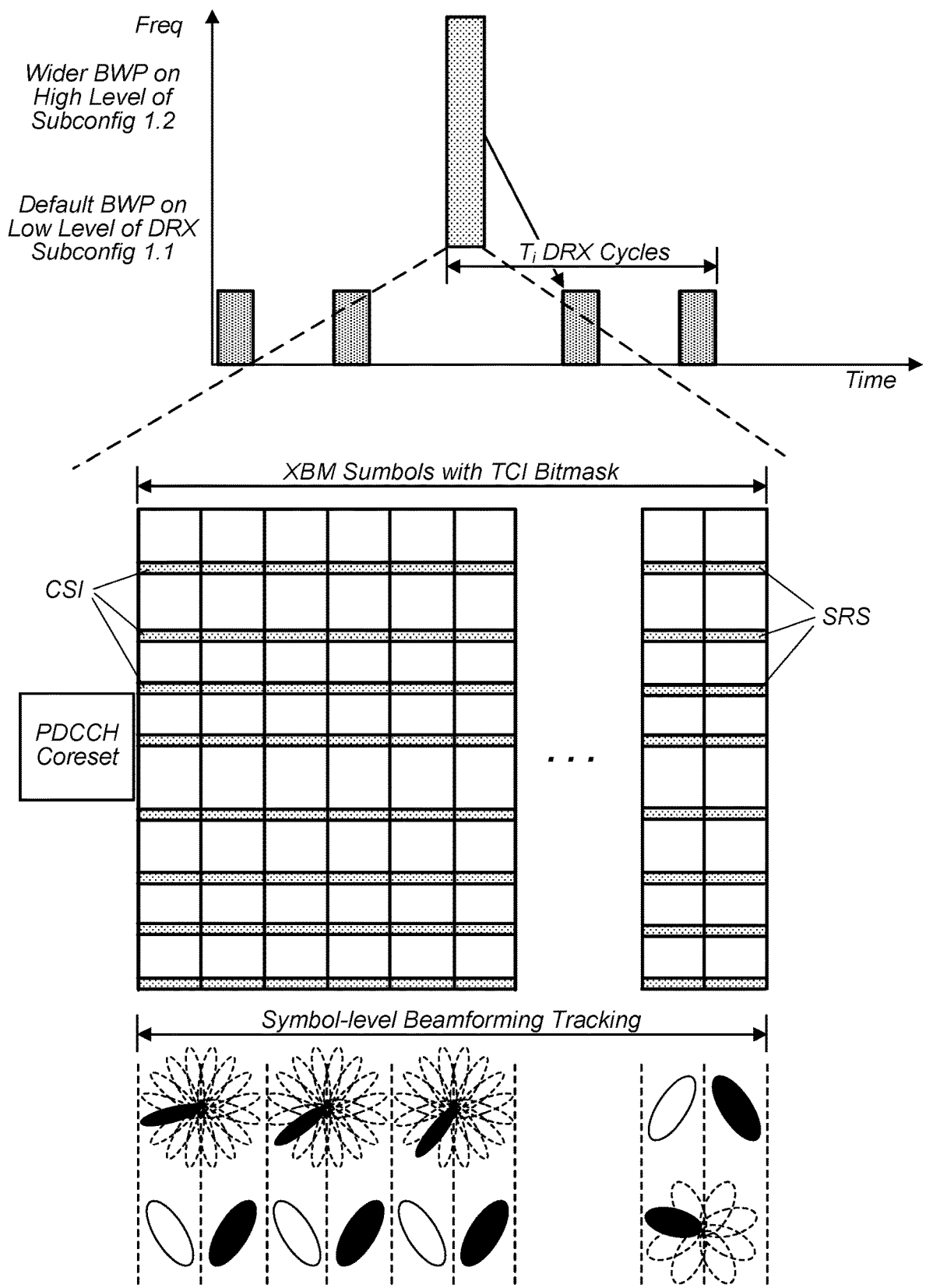
FIG. 9 is an illustration of a method for using BWP sub-configurations for performing beamforming tracking, according to some embodiments.

FIG. 9—Conducting Beamforming Measurements Using BWP Sub-Configurations

FIG. 9 illustrates a method for conducting beam-forming and/or other measurements using BWP sub-configurations, according to some embodiments. As illustrated, an activated mid-level transmission BWP may be used to perform beamforming tracking. In some embodiments, a PDCCH grant may be employed without PDSCH, enabling channel measurements without interrupting the CDRX timeline. For example, an indication may be given to a UE to sleep after X symbols in the current CDRX On period during which measurements are conducted with a signaled symbol-level CSI-RS transmission configuration indicator (TCI), quasi collocation (QCL), and/or SRS pattern. For example, the signaled symbol level CSI-RS pattern may describe the CSI-RS resource mapping for the next X symbols, which may correspond to the TX/RX beamforming indications on a configured TCI table. As a specific example, the PDCCH DCI may inform the UE of an upcoming TCI pattern (i.e., a transmit beamforming pattern), and may specify to the UE that, e.g., the next 6 symbols may be 1, 1, 4, 4, 3, 3. The UE may then lookup these symbols in a configured TCI table to determine which beamforming sweep pattern will be used by the gNB and to prepare a corresponding Rx beamforming pattern. Similarly, in SRS on the uplink, a gNB may instruct the UE to transmit using a particular Tx beamforming pattern.

An indication may be given to the UE to convert a BWP back to a lower level CDRX sub-configuration. The UE may thereby skip the rest of the $T_i$ duration for the particular CDRX cycle, thereby saving power. PUCCH resources may be employed to inform the gNB of the measurement results. Based on the measurement results, and further based on other measurement results of other BWPs (e.g., high-level resting BWPs), the gNB may determine to alter the sub-configurations of one or more of the BWPs. In various embodiments, the current UL DCI formats may be modified, or a new DCI protocol may be implemented. Beamforming and RRM measurements may be combined in a way that balances between beam tracking time and the on duration of the active BWP. In other words, the amount of time and resources used for beamforming tracking and RRM measurement may be dynamically balanced based on the current situation. For example, if a UE's channel quality is not very good on the currently active BWP, more time may be allocated to beamforming tracking (e.g., tracking more beams) to find a better beamforming direction. As another example, a UE may be in a relative instable state (rotating frequently, for example), and more resources may be spent on beamforming tracking. Alternatively, if UE is relatively stable (e.g., such that the current beamforming quality may be sufficient and may not require constant updates), the RRM may be given more time so that a more accurate CQI may be measured.

The following numbered paragraphs describe additional embodiments related to beamforming tracking.

In some embodiments, a method is performed by a base station. The method may include configuring a first bandwidth part (BWP) as a default BWP for a connected mode discontinuous reception (CDRX) communication session with a user equipment device (UE), wherein being configured as the default BWP causes the first BWP to be an active BWP unless it is overridden.

The method may further include configuring a second BWP as a transmission BWP for the CDRX communication session with the UE, wherein being configured as a transmission BWP causes the second BWP to periodically override the first BWP as the active BWP, wherein being configured as a transmission BWP further causes the UE to utilize the second BWP for performing beamforming tracking during a CDRX cycle in which the second BWP overrides the first BWP as the active BWP.

In some embodiments, in performing beamforming tracking, the UE utilizes a beamforming sweep schedule received from the base station via downlink control information (DCI).

In some embodiments, the method further includes utilizing, by the base station, downlink control information (DCI) to notify the UE to go to sleep a predetermined number of symbols after the second BWP overrides the first BWP as the active BWP.

In some embodiments, the first BWP becomes the active BWP on a subsequent CDRX cycle immediately following the CDRX cycle in when the second BWP is utilized for performing beamforming tracking.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
by a base station,
configuring a first bandwidth part (BWP) as a default BWP for a connected mode discontinuous reception (CDRX) communication session with a user equipment device (UE), wherein being configured as the default BWP causes the first BWP to be an active BWP unless it is overridden;
configuring a second BWP as a transmission BWP for the CDRX communication session with the UE, wherein being configured as the transmission BWP causes the second BWP to periodically override the first BWP as the active BWP with a predetermined fixed periodicity, and wherein said periodically overriding the first BWP as the active BWP is performed via systematic scheduling;
utilizing downlink control information (DCI) to notify the UE to go to sleep a predetermined number of symbols after the second BWP overrides the first BWP as the active BWP;
configuring one or more third BWPs as resting BWPs for the CDRX communication session with the UE, wherein being configured as the resting BWP causes the resting BWP to be periodically activated for performing channel measurements; and
reallocating the third BWP as the transmission BWP and the second BWP as the resting BWP based at least in part on determining that the third BWP is experiencing better channel conditions than the second BWP.

2. The method of claim 1,
wherein the second BWP is configured as the transmission BWP based at least in part on channel conditions experienced by the second BWP.

3. The method of claim 1,
wherein the transmission BWP periodically overrides the first BWP as the active BWP for a predetermined number of CDRX cycles.

4. The method of claim 3, the method further comprising:
by the base station:
notifying the UE through a downlink control information (DCI) message to reactivate the first BWP as the active BWP before expiration of the predetermined number of CDRX cycles.

5. The method of claim 1, the method further comprising:
by the base station:
utilizing media access control-control elements (MAC-CE) to activate or deactivate one or more of the default BWP and the transmission BWP.

6. The method of claim 1,
wherein channel measurements are performed by the UE on the resting BWP, and wherein the channel measurements are supplied by the UE to the base station.

7. The method of claim 1,
wherein the base station reallocates the third BWP as the transmission BWP and the second BWP as the resting BWP by utilizing media access control-control elements (MAC-CE).

8. The method of claim 1,
wherein the first BWP is located at a baseband frequency, and wherein the second BWP has a wider bandwidth than the first BWP.

9. A base station, comprising:
an antenna;
a radio coupled to the antenna; and
a processing element coupled to the radio, wherein the base station is configured to:
- configure a first bandwidth part (BWP) as a default BWP for a connected mode discontinuous reception (CDRX) communication session with a user equipment device (UE), wherein being configured as the default BWP causes the first BWP to be an active BWP unless it is overridden;
- configure a second BWP as a transmission BWP for the CDRX communication session with the UE, wherein being configured as a transmission BWP causes the second BWP to periodically override the first BWP as the active BWP with a predetermined fixed periodicity, and wherein said periodically overriding the first BWP as the active BWP is performed via systematic scheduling;
- utilize downlink control information (DCI) to notify the UE to go to sleep a predetermined number of symbols after the second BWP overrides the first BWP as the active BWP;
- configure one or more third BWPs as resting BWPs for the CDRX communication session with the UE, wherein being configured as the resting BWP causes the resting BWP to be periodically activated for performing channel measurements; and
- reallocate the third BWP as the transmission BWP and the second BWP as the resting BWP based at least in part on determining that the third BWP is experiencing better channel conditions than the second BWP.

10. The base station of claim 9, wherein the second BWP is configured as the transmission BWP based at least in part on channel conditions experienced by the second BWP.

11. The base station of claim 9, wherein the transmission BWP periodically overrides the first BWP as the active BWP for a predetermined number of CDRX cycles.

12. The base station of claim 11, wherein the base station is further configured to:
notify the UE through a downlink control information (DCI) message to reactivate the first BWP as the active BWP before expiration of the predetermined number of CDRX cycles.

13. The base station of claim 9, wherein the base station is further configured to:
utilize media access control-control elements (MAC-CE) to activate or deactivate one or more of the default BWP and the transmission BWP.

14. A non-transitory computer-readable memory medium comprising program instructions that, when executed by a processor of a base station, cause the base station to:
- configure a first bandwidth part (BWP) as a default BWP for a connected mode discontinuous reception (CDRX) communication session with a user equipment device (UE), wherein being configured as the default BWP causes the first BWP to be an active BWP unless it is overridden;
- configure a second BWP as a transmission BWP for the CDRX communication session with the UE, wherein being configured as a transmission BWP causes the second BWP to periodically override the first BWP as the active BWP with a predetermined fixed periodicity, and wherein said periodically overriding the first BWP as the active BWP is performed via systematic scheduling;
- utilize downlink control information (DCI) to notify the UE to go to sleep a predetermined number of symbols after the second BWP overrides the first BWP as the active BWP;
- configure one or more third BWPs as resting BWPs for the CDRX communication session with the UE, wherein being configured as the resting BWP causes the resting BWP to be periodically activated for performing channel measurements; and
- reallocate the third BWP as the transmission BWP and the second BWP as the resting BWP based at least in part on determining that the third BWP is experiencing better channel conditions than the second BWP.

15. The non-transitory computer-readable memory medium of claim 14, wherein the first BWP is located at a baseband frequency, and wherein the second BWP has a wider bandwidth than the first BWP.

16. The method of claim 1, wherein, when the second BWP overrides the first BWP as the active BWP during a CDRX cycle, the second BWP is utilized for beamforming tracking.

17. The method of claim 16, the method further comprising:
the base station,
sending, to the UE, a beamforming sweep schedule via downlink control information (DCI).

18. The method of claim 16, wherein the first BWP becomes the active BWP on a subsequent CDRX cycle immediately following the CDRX cycle in when the second BWP is utilized for performing beamforming tracking.

19. The base station of claim 9, wherein, when the second BWP overrides the first BWP as the active BWP during a CDRX cycle, the second BWP is utilized for beamforming tracking.

* * * * *